United States Patent [19]

Mattson et al.

[11] Patent Number: 5,416,915
[45] Date of Patent: May 16, 1995

[54] METHOD AND SYSTEM FOR MINIMIZING SEEK AFFINITY AND ENHANCING WRITE SENSITIVITY IN A DASD ARRAY

[75] Inventors: Richard L. Mattson; Jaishankar M. Menon, both of San Jose, Calif.

[73] Assignee: International Business Machines Corporation, Armonk, N.Y.

[21] Appl. No.: 989,245

[22] Filed: Dec. 11, 1992

[51] Int. Cl.$^6$ .................. G06F 11/16; G06F 12/06
[52] U.S. Cl. .................. 395/425; 371/10.1; 364/DIG. 1; 395/575
[58] Field of Search .................. 395/425, 575; 364/DIG. 1; 371/10.1, 40.1, 40.4

[56] References Cited

U.S. PATENT DOCUMENTS

| | | | |
|---|---|---|---|
| 4,207,609 | 6/1980 | Luiz et al. | 395/325 |
| 4,914,656 | 4/1990 | Dunphy et al. | 371/10.2 |
| 5,155,835 | 10/1992 | Belsan | 395/425 |

OTHER PUBLICATIONS

Patterson, et al, "A Case for Redundant Arrays of Inexpensive Disks (RAID)," Report No. UCB/CSD 87/391, Dec. 1987.

Primary Examiner—Glenn Gossage
Assistant Examiner—Sheela N. Nadig
Attorney, Agent, or Firm—R. Bruce Brodie

[57] ABSTRACT

A method and system for minimizing seek affinity and enhancing write sensitivity in a direct access storage device (DASD) array are disclosed. SEEK affinity and WRITE efficiency are preserved in which logical cylinders, as recorded on the DASD array, are managed as individual log structured files (LSF). Tracks or segments of data and parity blocks having the same or different parity group affinity and stored on the same or different DASD cylindrical addresses are written into a directory managed buffer. Blocks having the same parity affinity and written to counterpart cylinders are written out from the buffer to spare space reserved as part of each DASD cylinder. Otherwise, blocks are updated in place in their DASD array location.

10 Claims, 8 Drawing Sheets

MEDIATING BUFFER FOR LFS MANAGEMENT OF DASD ARRAY CYCLINDERS

MEDIATING BUFFER FOR LFS MANAGEMENT OF DASD ARRAY CYCLINDERS

Seek-Affinity & Write Sensitive Block Manager

| Disk Directory | | | | | Buffer Directory | | | |
|---|---|---|---|---|---|---|---|---|
| Addr | Disks (Parity Array N=3, P=1) | | | | | | | |
| CC-T | Vol-1 | Vol-2 | Vol-3 | Vol-4 | Name-P | V-CC-T | Dirty | |
| 10-0 | Daaf | Dbaf | Dcaf | P-af | Dd-b | 1-10-1 | 1 | Case-1 |
| 10-1 | Ddbf | Debf | P-bf | Dfbf | De-b | 2-10-1 | 1 | |
| 10-2 | Dgcf | P-cf | Dhcf | Dicf | Df-b | 4-10-1 | 1 | |
| 10-3 | xxxxx | xxxxx | xxxxx | xxxxx | | | | |
| 10-4 | xxxxx | xxxxx | xxxxx | xxxxx | | | | |
| 11-0 | P-df | Djdf | Dkdf | Dldf | Dg-c | 1-10-2 | 1 | Case-2 |
| 11-1 | Dmef | Dnef | Doef | P-ef | Dv-h | 2-12-1 | 1 | |
| 11-2 | Dpff | Dqff | P-ff | Drff | Dw-h | 3-12-1 | 1 | |
| 11-3 | xxxxx | xxxxx | xxxxx | xxxxx | | | | |
| 11-4 | xxxxx | xxxxx | xxxxx | xxxxx | (Dc-a) | 3-10-0 | 1 | Case-3 |
| 12-0 | (Dsgf) | P-gf | Dtgf | Dugf | Dk-d | 3-11-0 | 1 | |
| 12-1 | P-hf | Dvhf | Dwhf | Dxhf | Dt-g | 3-12-0 | 1 | |
| 12-2 | Dyif | Dzif | D7if | P-if | | | | |
| 12-3 | xxxxx | xxxxx | xxxxx | xxxxx | ... | ... | ... | |
| 12-4 | xxxxx | xxxxx | xxxxx | xxxxx | ... | ... | ... | |

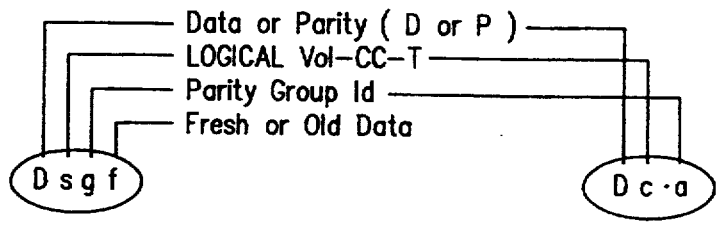

Disk Directory and Buffer Directory

*FIG. 2*

| Parity Array with N=3, P=1 | | | | | Directory | | |
|---|---|---|---|---|---|---|---|
| Addr | Disks | | | | | | |
| CC-T | Vol-1 | Vol-2 | Vol-3 | Vol-4 | Name-P | V-CC-T | Dirty |
| 10-0 | Daaf | Dbaf | Dcaf | P-af | Dd-b | 1-10-3 | 0 |
| 10-1 | xxxxx | xxxxx | xxxxx | xxxxx | De-b | 2-10-3 | 0 |
| 10-2 |  | P-cf | Dhcf | Dicf | Df-b | 4-10-3 | 0 |
| 10-3 | Ddbf | Debf | P-bf | Dfbf |  |  |  |
| 10-4 | Dgif | xxxxx | xxxxx | xxxxx |  |  |  |
| 11-0 | P-df | Djdf | Dkdf | Dldf | Dg-j | 1-10-4 | 0 |
| 11-1 | Dmef | Dnef | Doef | P-ef | Dv-j | 2-12-3 | 0 |
| 11-2 | Dpff | Dqff | P-ff | Drff | Dw-j | 3-12-3 | 0 |
| 11-3 | xxxxx | xxxxx | xxxxx | P-jf |  |  |  |
| 11-4 | xxxxx | xxxxx | xxxxx | xxxxx |  |  |  |
| 12-0 | Dsgf | P-gf | Dtgf | Dugf | Dc-a | 3-10-0 | 0 |
| 12-1 | P-hf |  |  | Dxhf | Dk-d | 3-11-0 | 0 |
| 12-2 | Dyif | Dzif | D7if | P-if | Dt-g | 3-12-0 | 0 |
| 12-3 | xxxxx | Dvjf | Dwjf | xxxxx | ... | ... | ... |
| 12-4 | xxxxx | xxxxx | xxxxx | xxxxx | ... | ... | ... |

Case-1: rows 10-0 to 10-4
Case-2: rows 11-0 to 11-4
Case-3: rows 12-0 to 12-4

Results of Write-back to Disk

*FIG. 3*

| Parity Array with N=3, P=1 | | | | |
|---|---|---|---|---|
| Addr | Disks | | | |
| CC-T | Vol-1 | Vol-2 | Vol-3 | Vol-4 |
| 10-0 | Daaf | Dbaf | Dcaf | P-af |
| 10-1 | xxxxx | xxxxx | xxxxx | xxxxx |
| 10-2 | Dgcb | P-cf | Dhcf | Dicf |
| 10-3 | Ddbf | Debf | P-bf | Dfbf |
| 10-4 | Dgjf | xxxxx | xxxxx | xxxxx |
| 11-0 | P-df | Djdf | Dkdb | Dldf |
| 11-1 | Dmef | Dnef | Doef | P-ef |
| 11-2 | Dpff | Dqff | P-ff | Drff |
| 11-3 | P-kf | xxxxx | Dkkf | xxxxx |
| 11-4 | xxxxx | xxxxx | xxxxx | xxxxx |
| 12-0 | Dsgf | P-gf | Dtgf | Dugb |
| 12-1 | P-hf | Dvhb | Dwhb | Dxhf |
| 12-2 | Dyif | Dzif | D7if | P-if |
| 12-3 | xxxxx | Dvjf | Dwjf | Dukf |
| 12-4 | xxxxx | Dzkf | xxxxx | xxxxx |

| Old Track Directory | |
|---|---|
| Name-P | V-CC-T |
| Dv-h | 2-12-1 |
| Dz-i | 2-12-2 |
| Dw-h | 3-12-1 |
| Dg-c | 1-10-2 |
| Dk-d | 3-11-0 |
| Du-g | 4-12-0 |
| ... | ... |
| ... | ... |

Old Track Directory

*FIG. 4*

Data Management Flow

Data Management Flow

Data Management Flow

Data Management Flow

Garbage Collection Flow

METHOD AND SYSTEM FOR MINIMIZING SEEK AFFINITY AND ENHANCING WRITE SENSITIVITY IN A DASD ARRAY

FIELD OF THE INVENTION

This invention relates to methods and means for managing direct access storage devices (DASDs), and more particularly, for managing access to arrays of DASDs in which favorable SEEK affinity and WRITE sensitivity are preserved.

DESCRIPTION OF RELATED ART

In the following paragraphs, the significant READ/WRITE accessing and data recording aspects of a DASD are set out. This is followed by an explanation of the storage performance measurements of SEEK affinity and WRITE sensitivity. Next, the log structure (LSF) storage model is described with reference to minimizing SEEKs on writing updates to storage. After this, the DASD array is discussed as one preferred form of DASD storage. Lastly, some of the drawbacks of defining an LSF over a DASD array are explained.

DASD LOGICAL ORGANIZATION

A direct access storage device (DASD) is a device in which access time is effectively independent of the location of the data as found for example on cyclic multitracked magnetic storage media. Such a DASD includes a plurality of disks concentrically mounted on a rotatable, constant angular speed, motor driven spindle. The disks are spaced apart along the spindle sufficient to permit one or more actuators to move radially over at least one surface on each magnetic disk.

A DASD further includes "read/write heads" for either imprinting a focused pattern of magnetic spots along a track or detecting the same. Data via the read/write heads is expressed as patterns of magnetic spots and recorded along one or more tracks following a predetermined format. Each track is divided into "cells" circumferentially. A predetermined number of cells forms a "sector". Positions along any track in relation to a head are determined by a rotational sensing past a reference point or marker (yielding sector and/or cell location). Consequently, each data element is physically located as some function of a DASD, disk, track, and sector coordinates.

Typically for each DASD, the read/write heads are attached to a single boom or moving arm assembly. The assembly may be moved in or out radially. When the assembly moves the read/write heads to a new position, a different set of tracks becomes accessible. In this regard, a "cylinder" refers to the set of tracks that can be accessed without repositioning the access assembly. Such a repositioning operation is termed a "SEEK".

SEEK Affinity and WRITE Sensitivity

There are several factors influencing the time spent SEEKing while processing data. These comprise the clustering of data in storage and the pattern of READs and WRITEs. In this regard, different applications executing on a host generate different patterns of read and write operations to system managed storage (SMS). The patterns include sequential or random referencing. The dominant factor is whether the data is stored contiguously or is itself dispersed. That is, if data were stored in contiguous locations such as consecutive locations on the same track, then either reading or writing the data sequentially would result in minimizing the amount of time spent SEEKing or physically repositioning the access assembly. On the other hand, if the data were randomly distributed about SMS, then the SEEK time spent in sequential access would be greatly increased. A frequent application is that found in updating and querying databases. These applications exhibit a pattern of random writes for updating followed by queries generating sequential READs. One measure to minimize SEEKs with respect to write operations is to use an "update in place" algorithm. However, when updating parity coded data on DASDs in an array, write updates are said to incur a "write penalty". This arises from the fact that four operations per update are required. Other measures for minimizing write SEEKs include batching of operations of the same kind such as updates and subsequently writing them out sequentially to DASD.

Two metrics are used in this specification for assessing storage system efficiency. These are SEEK AFFINITY and WRITE SENSITIVITY and are defined as follows:

SEEK AFFINITY is the ratio of the true average SEEK time while executing any given workload divided by the average random SEEK time for the DASD. The smaller the value of seek affinity, the better the performance.

WRITE SENSITIVITY, also termed "write efficiency" is used as a measure of the system managed storage resource needed to perform a WRITE on parity coded data. An "update-in-place" of parity coded data requires reading of the old parity, reading of the old data, calculating the new parity, and writing out the new parity and new data.

LOG STRUCTURED ARRAYS

When a system is more sensitive to writing efficiency than it is to preserving seek affinity, a Log-Structured Block Manager or File System can be used.

Rosenblum et al, "The Design and Implementation of a Log Structured File System", ACM Transactions on Computer Systems Vol. 10 No. 1, Feb. 1992, pp. 26-52, defines a "log structured file" (LSF) as an arrangement which writes all new information to DASD in a sequential structure termed a "log". Spare space is kept in the subsystem and modified data is collected in a buffer in memory, i.e. the log, until a large number of blocks are ready to be written. By buffering a sequence of writes and updates and batch writing all new information sequentially in a single DASD operation, then write performance improves by eliminating almost all SEEKs.

The sequential structure of the log also permits faster crash recovery. Note, an LSF or log contains indexing and directory information. Thus, directory look up rather than sequential scans of the log can be used.

To minimize SEEKs with respect to recording, writing out is performed in consecutive or contiguous physical addresses. This requires that a large amount of free space be available. This, in turn, mandates garbage collection by collecting live data from heavily fragmented segments and writing such data compactly into empty segments. Of course, this dramatically affects SEEK affinity in respect of READ operations since locality of READ referencing is destroyed.

In the case of log structured DASD arrays with parity, parity is added to the blocks in memory and the blocks with their parity blocks are considered new parity groups and are written as a unit to new locations on the disks.

The DASD Array

As discussed above, a log structured file is a storage management view of storage. It can be defined onto a variety of dissimilar DASD storage configurations including that of a DASD array. A DASD array may be loosely thought of as a method and means for managing subsets of DASDs to increase concurrency, throughput (data rate), and enhanced fault tolerance through striping and redundancy of data, spare storage, and synchronous accessing of selective subsets of DASDs. Significantly, neither LSF or DASD array organization alter the absolute cylindrical addressing pattern of data and parity blocks on DASD volumes or devices.

Patterson et al, "A Case for Redundant Arrays of Inexpensive Disks (RAID)", Report No. UCB/CSD 87/391, December 1987, Computer Science Division, U. of California, Berkeley. is the seminal reference setting out the now well known DASD array RAID 1-5 typology and classification.

As one reads Patterson, each RAID type 1-5 is defined along a continuum.

Starting with RAID 1, each data block is recorded on a pair of DASDs such that any failure or error in the path to data on the primary DASD merely results in electronically switching to the secondary DASD. The disadvantage is that for any given Q DASDs required to retain the data, then 2*Q (100% redundancy) or double the number of DASDS are required.

RAID 2 involves bit interleaving data and Hamming error detecting and correcting code bits and writing them (bit striped) counterpart DASDs. While this reduces the number of redundant DASDs, it still requires a significant fraction to effectuate recovery.

RAID 3 segments a data string into n data blocks, computes parity or other redundancy code block thereover, and synchronously writes n+1 blocks to counterpart n+1 DASDs.

RAID 4 provides for accessing subsets of DASDs within an array concurrently and independently.

Lastly, RAID 5 spreads parity blocks over multiple DASDs while accessing array DASD subsets concurrently and independently. Of the five RAID types, RAID 3 and 5 find most current use. In this regard, RAID 3 is applied to numerically intensive data streaming applications while RAID 5 finds favor with transaction management applications where concurrency can be increased at the expense of throughput. Relatedly, Patterson makes the case that arrays formed from many inexpensive DASDs can more nearly match the data rate and availability with controlled redundancy than single large capacity DASDs can.

LSF and the DASD Array

The log-Structured approach taking a DASD array as a whole has an increased efficiency of writing modified data, but it comes at a cost of:

(1) losing SEEK affinity;

(2) having to maintain a directory structure which keeps track of the dynamically changing physical location of logical blocks of information and;

(3) having to periodically garbage collect together blocks that have not been modified and move them to new locations in order to leave contiguous clean space for writing the large units of modified blocks from the log.

SUMMARY OF THE INVENTION

It is an object of this invention to devise a method and means for accessing system managed storage so as to favorably preserve SEEK affinity and WRITE sensitivity.

It is a related object that said method and means favorably preserve affinity and sensitivity where the system managed store includes a DASD array.

It is yet another object that said method and means utilize aspects of an LSF and yet minimize the penalties of an LSF loss of SEEK affinity occasioned by (1) shadow writing increasing the scatter or loss of locality of referencing, (2) maintenance and use of constructs such as directories to control a dynamically changing storage, and (3) the need for garbage collection to provide consecutive space over which to execute batch write updates.

The forgoing objects are believed satisfied by a method and means in which groups of cylinders, as recorded on a DASD array, are managed as individual log structured files (LSF). Tracks or segments of data and parity blocks having the same or different parity group affinity and stored on the same or different DASD cylindrical addresses are written into a directory managed buffer.

Destaging from the buffer to the array requires either (1) writing blocks from the log (buffer) to new DASD locations on the same cylinder. That is, writing blocks from a segment to SPARE or reclaimed DASD array locations on the SAME or nearby cylinders where the blocks have the same parity group affinity and are stored on the same DASD cylinder counterparts, or (2) writing from the log to the addressed DASD cylinder as an UPDATE-IN-PLACE where either (a) the blocks in the segment have the same affinity but are stored on different counterpart DASD cylinders, or (b) where the blocks have a different affinity and at least one block is located on a different counterpart DASD cylinder.

In this invention, a "parity group" is defined to be N data blocks written on a group of N predetermined tracks on N different DASDs with a counterpart parity track being written on a predetermined (N+1)st DASD.

The key concept is that of treating each cylinder of groups of data as an LSF permitting SEEK affinity within the cylinder group to be preserved. The SEEK affinity is retained by retaining some of the spare space normally associated with an LSF on each cylinder.

This is advantageous where sequential scans of data in contiguous DASD locations occur.

BRIEF DESCRIPTION OF THE DRAWING

FIG. 2 depicts the parity group, logical cylinder, DASD, parity, and status of contents of the mediating buffer by way of a DASD array directory and buffer directory.

FIG. 3 sets out the writing out to the DASD array of the contents of the mediating buffer according to the invention as expressed in array and buffer directory changes.

FIG. 4 shows the DASD array and buffer directory changes and includes an "old track directory".

DESCRIPTION OF THE PREFERRED EMBODIMENT

Figure 1:
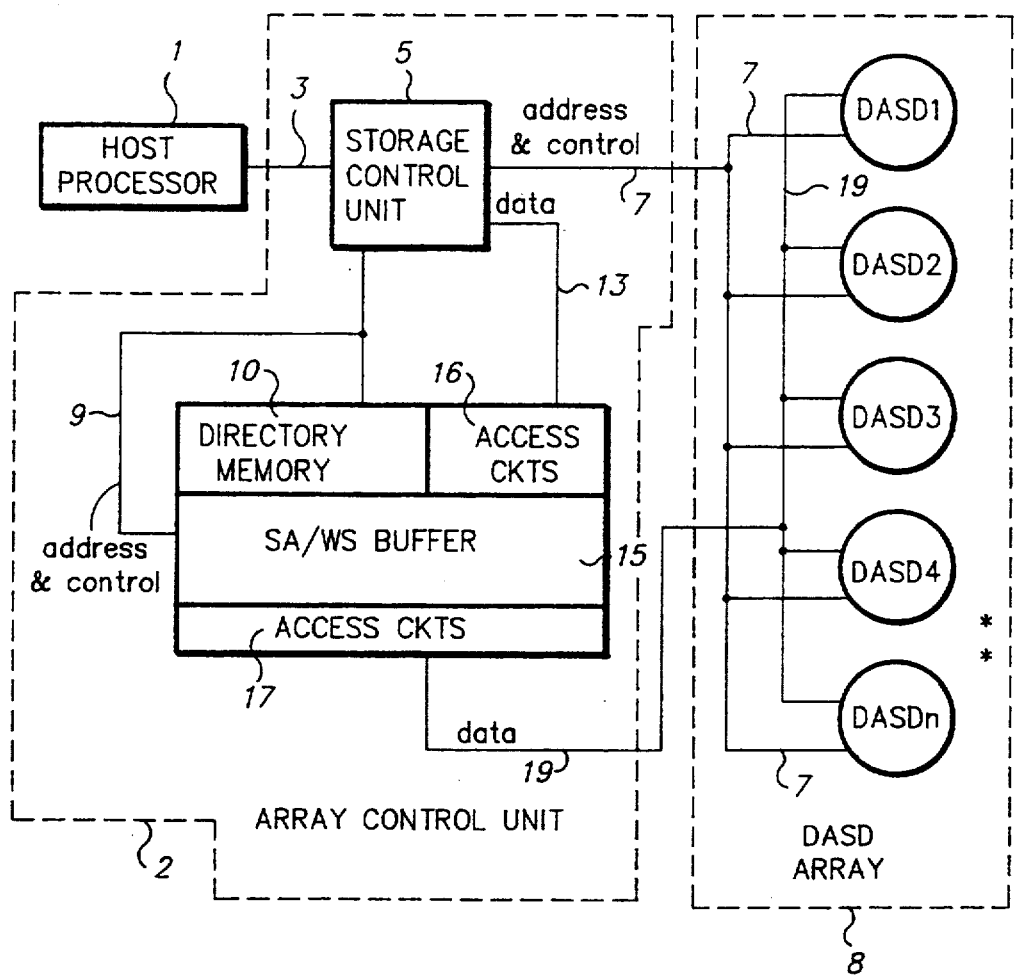
FIG. 1 shows a CPU accessing an array of DASDs through a mediating managed buffer according to the invention.

Referring now to FIG. 1, there is shown a system including a host processor 1, and an external store. The latter is formed from an array 8 of N+1 DASDs, and an array control unit 2 coupling the processor to the array. Processor 1 preferably comprises at least one or more processors used to execute application and system code; memory to hold application code, system code, and data; and a means responsive to read and write calls from executing applications for accessing information through the system code (otherwise termed operating system such as MVS, AIX, CICS etc) not otherwise in memory from the external store.

Typically, as described in Luiz et al, U.S. Pat. No. 4,207,609, "Method and Means for Path Independent Device Reservation and Reconnection in a Multi-CPU and Shared Device Access System", issued Jun. 10, 1980, and the references cited therein, there is shown an architecture for establishing an access path to data by which a processor host or CPU obtains variable or fixed length records from an attached DASD storage subsystem.

Under this architecture, the CPU creates a dedicated virtual processor for accessing and transferring data streams over demand/response interfaces to attached subsystems using chains of special purpose I/O instructions termed "channel command words" or CCWs. The CCWs are stored in a portion of CPU main memory in support of fast calls. When an application program executes a read or write requiring access to external storage (usually attached DASD storage), then the CPU S/370 MVS operating system initiates such a reference with a START I/O command. This command causes the CPU to suspend its multi-processing state, transfer to the CCW chain, and re-establish its prior state after CCW chain completion.

Referring again to FIG. 1, processor 1 sends an appropriate CCW chain to storage control unit (SCU) 5 over path 3. SCU 5 "interprets" each of the CCW's and responsively applies counterpart control and address signals over path 9 to directory memory 10 to ascertain location of data either in the Seek Affinity/Write Sensitive (SA/WS) buffer 15 or on DASD array 8. Data is transferred between host processor 3 and array 8 over a path including path 3, SCU 5, path 13, access 16, buffer means 15, access circuits 17, and path 19. The host is accessing data using a storage model maintained by the array control unit 2. In this invention, the storage model is managed by the SCU portion of the array control unit 2 as that of managing DASD cylinders as individual LSF's. This is expressed by the destaging (writing) of buffer 15 contents onto the array DASDs (DASD1 –DASDn+1) in predetermined patterns and conditions.

SCU 5 and buffer 15 comprise at least one or more microprocessors with sufficient associated memory for storing software for interpreting the CCWs and managing the buffer and the DASD array according to the LSF storage model, a directory located in directory memory 10 showing the mapping from logical blocks of data to physical data blocks, means for forming a group of blocks having a logical affinity and computing parity or other redundancy code thereover, buffer means 15 for holding modified blocks of data, and paths 7 and 19 for moving data & control signals between any DASD and buffer means 15.

DASD array may be managed by SCU 5 as a RAID 3 or a RAID 5 array as defined by the aforementioned Patterson reference. In a RAID 3 embodiment for DASD array 8, the data string segmentation or striping, parity assignment to the blocks of a group, synchronous accessing of a parity group or block from counterpart DASDs and the array operation in both fault tolerant and degraded modes is set out in Dunphy et al, U.S. Pat. No. 4,914,656, "Disk Drive Memory", issued Apr. 3, 1990.

Referring now to FIG. 2, there is shown the organization of directory 10. It consists of a disk or DASD directory and a directory for the contents of buffer 15. At the left of the figure is a directory for the DASD or DISK ARRAY with parity containing physical DASDs 1–4. As may be recalled, a DASD or disk store is formed from a set of concentric cylinders. Each cylinder in turn is formed from a track on a counterpart disk of usually a multi disk store. The concentric cylinders are denominated "volumes". Thus, the contents stored on DASD 1 would be termed as "volume 1" etc. For purposes of FIG. 2, DASDs 1–4 are denominated as Vol-1,Vol-2, Vol-3, and Vol-4 respectively. Whereas this invention refers to a "disk track" as being the smallest addressable unit, the techniques also apply to blocks within a track, several tracks, etc., as being the smallest addressable unit of information and the words "block", "segment", etc. can be substituted for the word "track" without loss of generality.

Referring again to FIG. 2, the Cylinder-Track address, CC-T, of each track on a disk is shown in the first column. The contents of Disk Vol-1 is shown in the second column where the notation "Dgcf" (on Vol=1,CC=10,T=2) is defined as follows:

"D" means this track contains only DATA;

"g" means it corresponds to a logical Vol-ID-CC-T named g;

"c" means it belongs to parity group c; and

"f" means the data is fresh (the most recent disk version of that logical track).

In a similar manner, the con-tents of Disk Vol-4 is shown in column 5 of FIG. 2, and "P-af" located at Vol-CC-T=4-10-0 means it is a parity track for parity group "a" and it is fresh. Note that in this invention a parity group is defined as a group of N tracks on N different disks whose parity track is on another (N+1)-st disk. The first parity bit on the parity track is the Exclusive-OR of the first bits on the N tracks belonging to that parity group. Similarly for all the other bits on the parity track.

The contents of part of the buffer 15 directory is illustrated in the next three columns of FIG. 2. While a buffer directory would usually contain more than three columns, such are not shown as they are considered extraneous to the invention. The column contents are explained as follows:

(1) The first column lists the logical name of tracks of data currently residing in the buffer 15 memory, where, for example: "Dd-b" in the Name-P column means that Data track "d" belonging to parity group "b" is currently in the buffer.

(2) The V-CC-T column tells that "Dd-b" has a disk home location of "1-10-1" (Vol=1, CC=10, T=1), and if we look at that location to the left of FIG. 2 we find "Ddbf".

(3) The last illustrated column in the directory is a "dirty bit" column which if equal to 1 means that some of the data on that track has been modified in the buffer and has not yet been copied back to a location on the disk. Only dirty tracks are illustrated in FIG. 2 but the real directory contains both clean and dirty tracks.

This invention preserves Seek Affinity by keeping some of the spare space normally associated with a Log-Structured DASD array on each cylinder as is illustrated by "xxxxx" at the left of FIG. 2 at column CC-T address entry 10-3 and 10-4.

Referring yet again to FIG. 2, there are depicted in the right hand part three cases of writing from buffer to disk. These are:

Case 1

(The Best Case), shows the case where the directory entries have been sorted by dirty-bit and parity group and all the data (N=3 tracks) from one parity group is dirty. In this case, an updated version of the same parity can be formed in the buffer, and either the entire parity group can be written back to their original locations on disk as shown in FIG. 5(b), or these data tracks and the parity track can be written to a spare track on the same physical cylinder as they originally came from as shown in FIG. 3. Both policies preserve seek affinity, but the second policy is more fault tolerant. The result of the second policy is illustrated in FIG. 3, where the resulting disk and directory entries are shown circled after the 4 disk writes are completed.

Case 2

(The Most Frequent Case), shows the case where the directory entries have been sorted by dirty-bit and Vol-ID and N=3 disks have dirty tracks. In this case, a NEW PARITY GROUP, j, can be formed in the buffer, and these data tracks and the parity track can be written to a spare track on the same physical cylinder as they originally came from. The directory entry for the old location of each track must have the "f" for fresh changed to a "b" as bad or old, and again. The result is shown with reference to the circled entries in FIG. 3. This policy preserves seek affinity where the resulting disk and directory entries are shown after the 4 disk writes are completed.

Case 3

(An Extreme and Infrequent Case), shows the case where the directory entries have been sorted by dirty-bit and Vol-ID and all the dirty tracks are on the same disk and on different cylinders. If this is an extreme case and these tracks must be de-staged now (waiting is better since it is possible that more tracks will become dirty and Case-2 or Case-1 will exist), update in place is a good choice that preserves seek affinity. Thus, old parity and old data must be read into the buffer (if they are not already there), and then new data and new parity written back to their original locations on disk. This operation preserves seek affinity and the result is illustrated in FIG. 3, where the resulting disk and directory entries are shown after the 6 disk reads and 6 disk writes are completed.

One alternative to this update-in-place solution, which required a maximum of 12 disk operations to write 3 tracks, is to find 6 clean data tracks in the buffer, 3 on each of two different disks (1 and 2, 1 and 4, or, 2 and 4), mark them as dirty, and proceed as in Case-2 with 12 writes to disk for 9 data tracks and 3 parity tracks. However, this approach uses up free space and may necessitate the additional work of "garbage collection" which is explained later. Another alternative, if such clean tracks are not in the buffer, is to read the necessary tracks into the buffer, mark them as dirty, and execute a Case-1 or Case-2 operation. However, the additional reads and future garbage collection would increase the work to be done and is usually not a viable alternative to update in place.

Case-1, Case-2, and Case-3 are not the only cases. In fact, numerous other cases between dirty bits, Vol-Id's, and parity groups can occur (e.g. N-1 members of a parity group are dirty, N-1 Vols. have dirty tracks, etc.). In addition, several instances of the same case (such as Case-2 above) can be present in the buffer directory at the same time. While work is being executed by the DASD array control unit 2, choices must be made between which group of tracks to write from buffer to disk and whether to update in place, form new parity groups from dirty tracks, mark clean tracks as dirty, or read additional tracks from disks before executing one of these alternatives.

For this invention, the best choice is made by calculating the present and future work that needs to be done, using information about the activity of the tracks being considered, selecting the least work to be done on the most inactive tracks as the preferred embodiment, and then writing to spare space on the same cylinders. This is illustratively set out in the aforementioned Rosenblum et al reference.

Referring now to FIG. 4, there is illustrated an "old track directory" maintained for the purpose of "garbage collection". "garbage collection" is a necessary task for the buffer manager. This is the process of moving "fresh" tracks from parity groups that contain one or more "old" tracks to turn the space occupied by the parity group into spare space. Thus, the key to garbage collection in this invention is the "parity group", because only when every data member of a parity group is "old" can the space (including parity track) be marked as available.

The data artifacts subject to garbage collection varies on the nature and need for the spare space. In FIG. 4, the old track directory is sorted by Vol-Id-CC. It should be observed that Vol=2, CC=12 has 2 entries. This means that all the spare space on that cylinder is gone. Parity groups h and i are the groups of interest and it can be noted that there are the most old tracks from parity group h so that it is the one to garbage collect. The buffer manager in SCU 5 includes software to ascertain all the members of a parity group so item "Dxhf" can be located, read into the buffer, and marked as dirty, thus freeing locations 1-12-1, 2-12-1, 3-12-1, and 4-12-1, which can be marked as available and Vol=2, CC=12, now has spare space. A similar mechanism for ascertaining parity group identity is described in Belsan, U.S. Pat. No. 5,155,835, "Multilevel, Hierarchical, Dynamically Mapped Data Storage Subsystem", issued Oct. 13, 1992.

Referring now to FIGS. 5(a) through 5(e), there is shown a pseudo code rendition of control flow and data pathing executed by SCU 5 in conjunction with buffer 15 and the data elements therein for effectuating LSF management of data cylinders per the invention. These are a formalization of the description heretofore provided. They set out the control with attention to the programming constraints which necessarily attend formulation of a source and object code rendition in a specific language such as PASCAL, FORTRAN, PL/1 and the like which is believed well within the ken of the skilled artisan in this art.

Figure 5A:
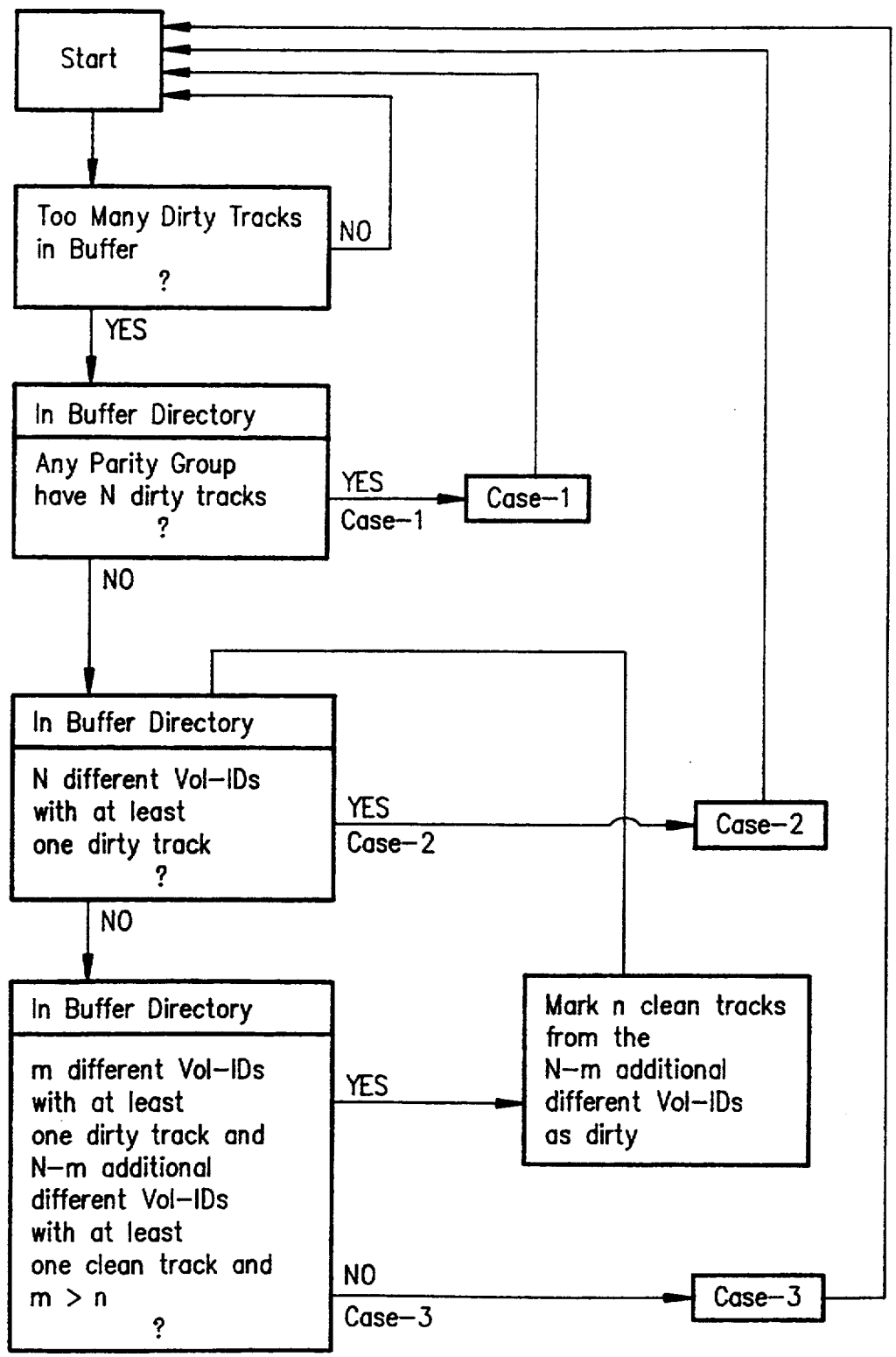
FIGS. 5a–5e display a pseudo-code rendition of evaluating the contents of and dynamically switching between writing from the log (buffer) to new DASD locations on the same or nearby cylinder group and writing from the log as an update in place operation.
Figure 5B:
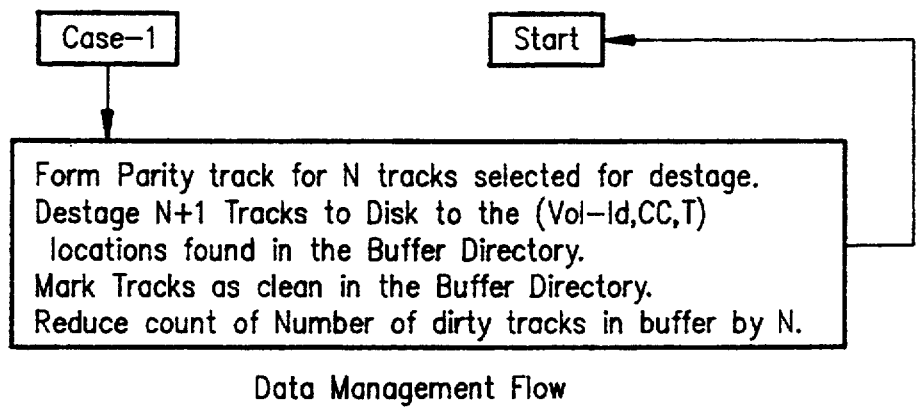
Figure 5C:
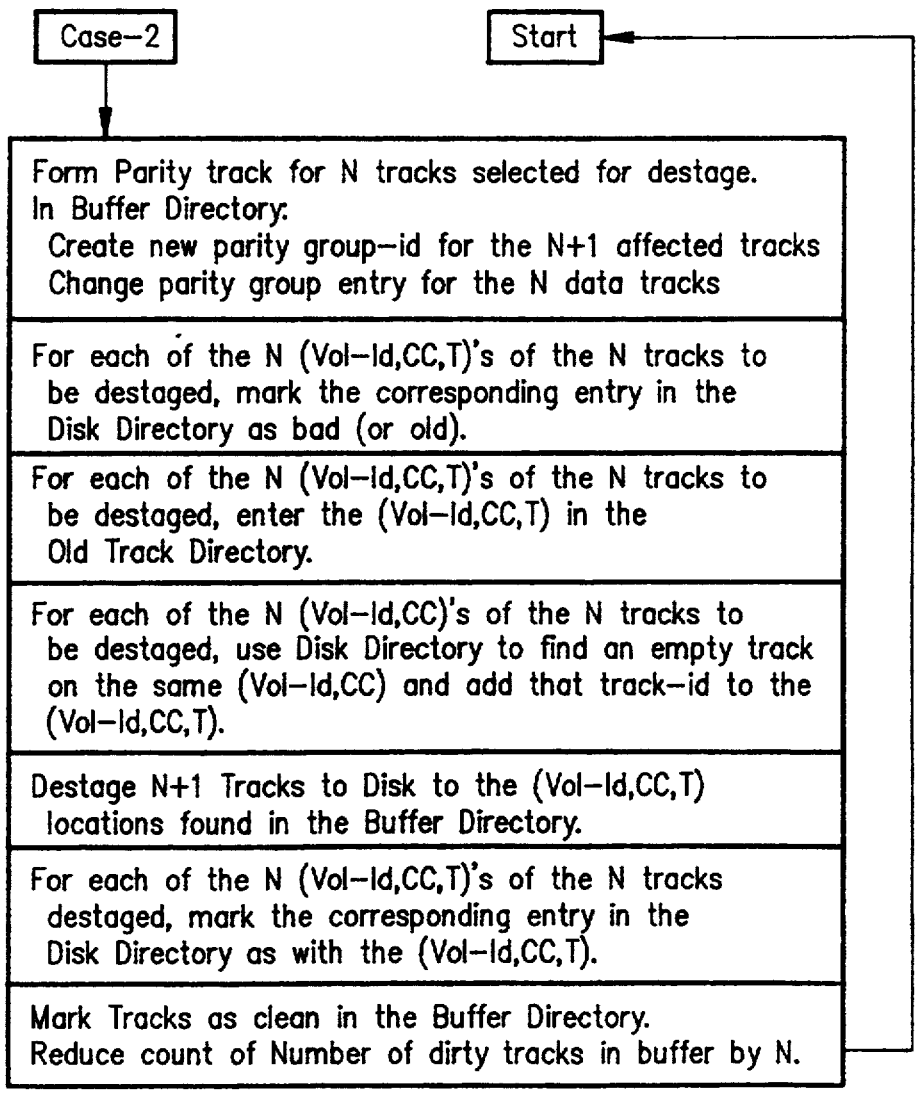
Figure 5D:
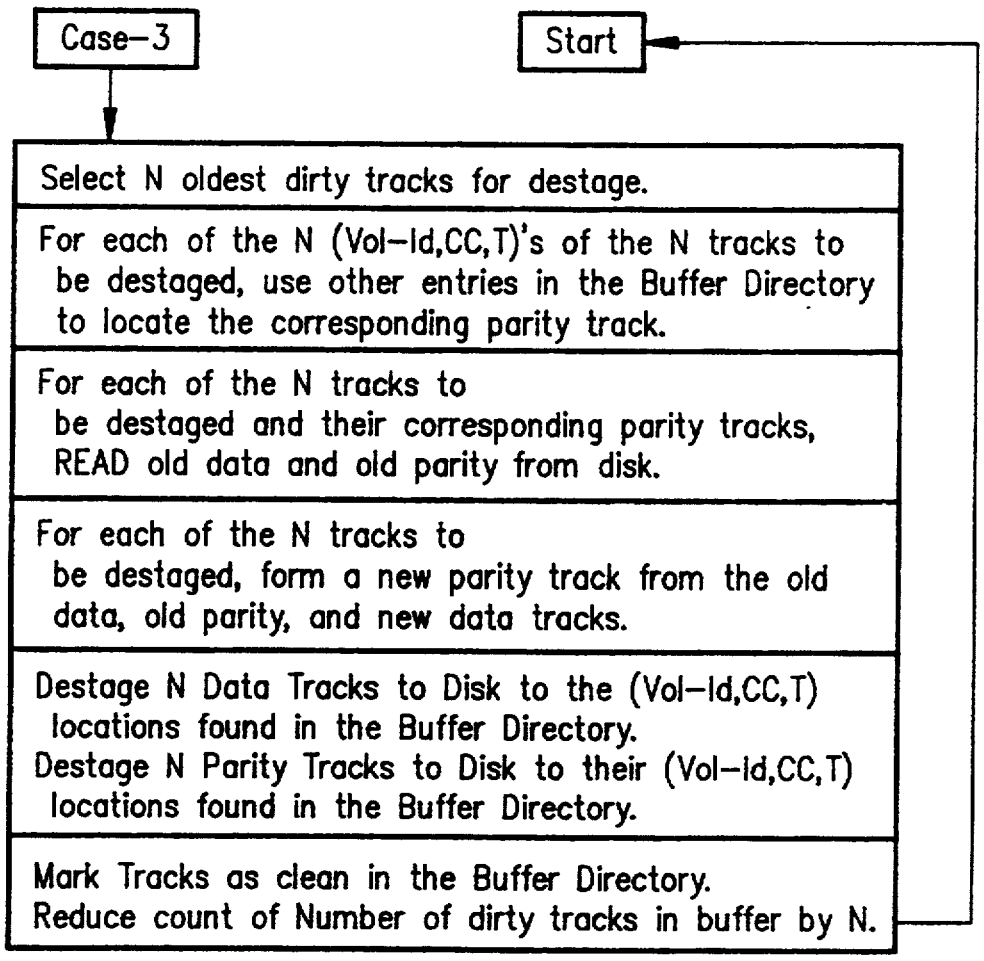
Figure 5E:
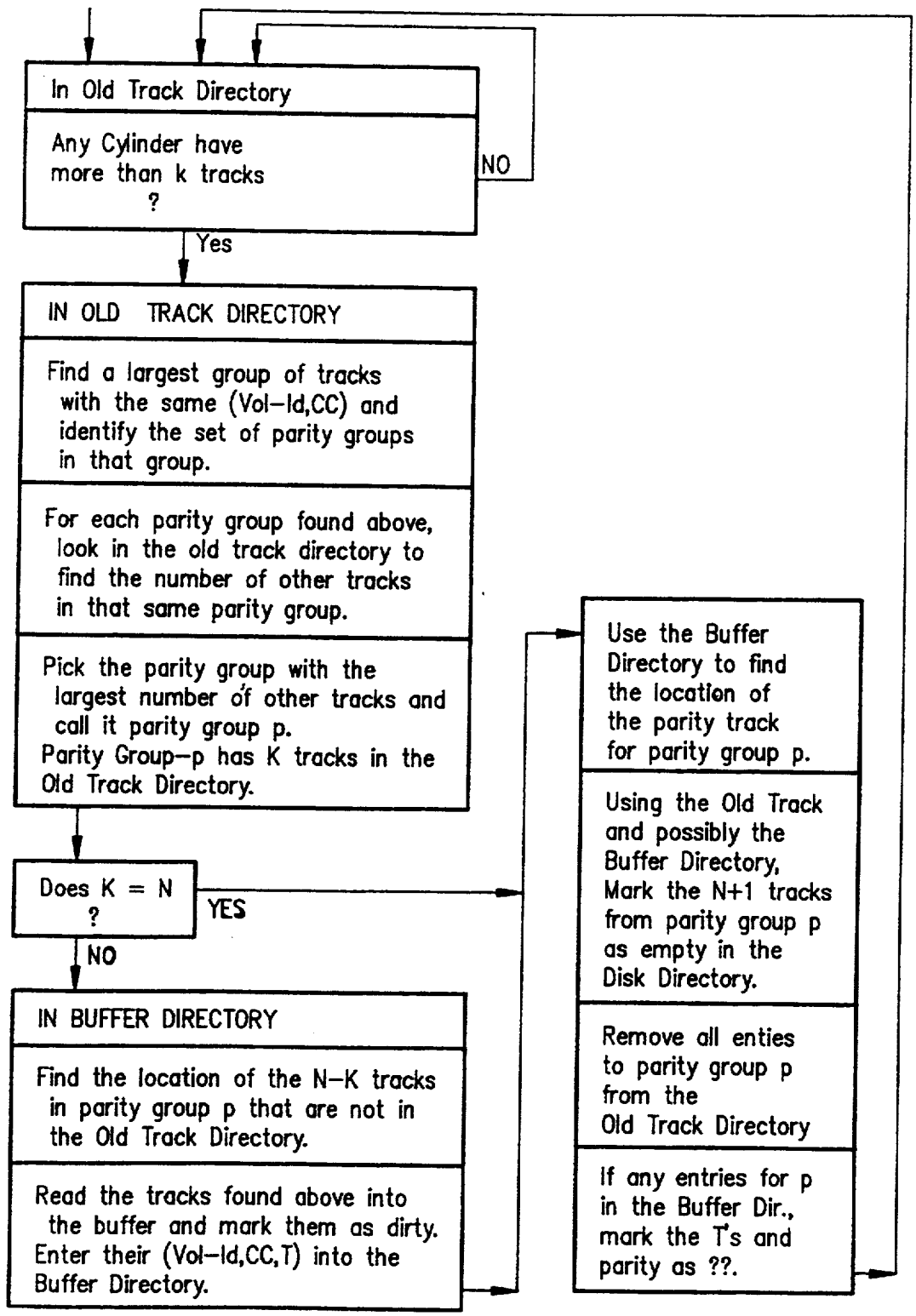

FIG. 5(a) shows the overall data management flow for the three cases of redundancy or parity group affinity and whether the referenced blocks are located on the same or different counterpart DASD cylinders in the array. FIGS. 5(b), 5(c), and 5(d) treat respectively the detail flow for cases 1-3. Lastly, FIG. 5(e) depicts the space reclaiming or so called "garbage collection" flow of control necessary for managing each of the cylinders as a log structured file.

EXTENSIONS

It should be appreciated that in view of the above teaching that while the preferred embodiment of the invention describes writing data to the same cylinder in a DASD array with parity, one skilled in this art could easily extend it to writing to a group of cylinders or writing to "nearby" cylinders in DASD arrays with parity or to DASD subsystems without parity.

The notion of parity group can be extended to include not only that of a predetermined number of logically related data blocks and a parity block formed from the exclusive OR'ing of the data blocks. That is, it can encompass redundancy group in which the redundancy block is formed by Reed-Solomon or B-Adjacent coding of the predetermined number of said logically related data blocks.

These and other extensions of the invention may be made without departing from the spirit and scope thereof as recited in the appended claims.

We claim:

1. In a system having an array of cylindrically addressable direct access storage devices (DASDs) for storing redundancy groups, each group being formed from a set of logically related data blocks and a redundancy block coded from said logically related data blocks, means for writing data and redundancy blocks having the same or different redundancy group affinity and stored in the same or different DASD cylindrical addresses into a directory managed buffer, and means for transferring blocks and redundancy groups between the buffer and the DASD array, wherein the improvement comprises the method steps of iteratively:
   (a) writing blocks from the buffer into reserved DASD array locations on the SAME or nearby DASD cylinder where the blocks have the same redundancy group affinity and are stored on the same DASD cylinder counterparts; and
   (b) writing from the buffer to the DASD cylinder addresses as an UPDATE-IN-PLACE where either
      (1) the blocks have the same redundancy group affinity but are stored on different counterpart DASD cylinders, or
      (2) where the blocks have a different redundancy group affinity and at least one block is located on a different counterpart DASD cylinder.

2. The method according to claim 1, wherein the redundancy block is selected and coded from one of a set consisting of a simple parity code, a Reed-Solomon code, and a B-adjacent code.

3. In a system having an array of cylindrically addressable direct access storage devices (DASDs), means for writing data and parity blocks having the same or different parity group affinity and stored in the same or different DASD cylindrical addresses into a directory managed buffer, and means for transferring blocks and parity groups between the buffer and the DASD array, wherein the improvement comprises the method steps of iteratively:
   (a) reserving or reclaiming spare locations in each DASD cylinder;
   (b) ascertaining the parity group affinity, location, and status of each block written into said buffer;
   (c) either writing blocks from the buffer to reserved or reclaimed DASD array locations on the SAME or nearby DASD cylinder where the blocks have the same parity group affinity and are stored on the same DASD cylinder counterparts, or writing from the buffer to the addressed DASD cylinder as an UPDATE-IN-PLACE where either
      (1) the blocks have the same affinity but are stored on different counterpart DASD cylinders, or
      (2) where the blocks have a different affinity and at least one block is located on a different counterpart DASD cylinder.

4. A method for minimizing SEEK affinity and enhancing WRITE sensitivity in destaging segments containing parity groups of n data plus p parity blocks between a directory organized buffer and an array of cylindrically addressable direct access storage devices (DASDs), comprising the iterative steps of:
   (a) reserving or reclaiming spare space in each DASD cylinder;
   (b) writing segments of new or modified parity groups into the buffer and ascertaining the parity group affinity, location, and status of each block in each segment; and
   (c) writing the blocks in each segment from the buffer to spare DASD locations on the same or nearby cylinder where the blocks in any given segment belong to the same parity group located on the same cylinder across the counterpart DASDs, or, writing the blocks in each segment from the buffer to the original DASD cylinder location as an UPDATE-IN-PLACE where the blocks in any given segment belong to different parity groups at least one block being located on a cylinder different from the others across the DASDs or where the blocks belong to the same parity group but are located on different cylinders across the DASDs.

5. A method for destaging tracks of data between a directory organized buffer and an array of DASDs where parity groups of n data and p parity blocks per group are written across cylindrically arranged locations on counterpart DASDs in the array, and where each staged or destaged track selectively includes blocks from the same or different parity group located on the same or different cylinders, comprising the steps of:
   (a) reserving or reclaiming spare locations on each DASD cylinder;
   (b) writing at least one track of new or updated blocks to the buffer and updating the buffer directory as to the parity group (Name-P), DASD cylindrical address (V-CC-T), and update status (dirty) of each block in each track;
   (c) ascertaining whether the blocks in each track written to the buffer form the same or different parity groups to be destaged to the same or different DASD cylindrical locations; and (d) destaging tracks according to step (c) from said buffer to DASDs of the array by either writing the blocks from the buffer to SPARE DASD locations on the SAME or nearby cylinder where the blocks belong to the same parity group located on the same cylinder across the counterpart DASDs, or, writing the blocks from the buffer to the original DASD cylinder location as an UPDATE-IN-PLACE where the blocks belong to different parity groups at least one block being located on a cylinder different from the others across the DASDs or where the blocks belong to the same parity group located on different cylinders across the DASDs.

6. The method according to any one of the claims 1, 3, 4, or 5, wherein a redundancy or parity group comprises N data blocks written on N predetermined tracks on N different DASDs with a redundancy or parity block being computed over said N data blocks and written on a (N+1)st DASD.

7. The method according to any one of the claims 1, 3, 4, or 5, wherein the method further includes the step of reserving or reclaiming spare locations on each DASD cylinder according as to whether the locations have not been overwritten within a predetermined period of time.

8. The method according to any one of the claims 3, 4, or 5, wherein steps (a) and (c) are executed on an opportunistic or scheduled basis.

9. The method according to claim 1, wherein the DASD array is of the type where the blocks belonging to the same redundancy group are synchronously accessed across counterpart DASDs.

10. A system comprising:

(a) an array of cylindrically addressable direct access storage devices (DASDs);

(b) a directory managed buffer;

(c) means for writing data and parity blocks having the same or different parity group affinity and stored in the same or different DASD cylindrical addresses into the buffer;

(d) means for transferring blocks and parity groups between the buffer and the DASD array, said means include (1) means for reserving or reclaiming spare locations in each DASD cylinder;

(2) means for ascertaining the parity group affinity, location, and status of each block written into said buffer;

(3) means for selectively either writing blocks from the buffer to reserved or reclaimed DASD array locations on the SAME or nearby DASD cylinder where the blocks have the same parity group affinity and are stored on the same DASD cylinder counterparts, or, writing from the buffer to the addressed DASD cylinder as an UPDATE-IN-PLACE where either (1) the blocks have the same affinity but are stored on different counterpart DASD cylinders, or (2) where the blocks have a different affinity and at least one block is located on a different counterpart DASD cylinder.

* * * * *